United States Patent [19]
Cleveland

[11] Patent Number: 5,853,648
[45] Date of Patent: Dec. 29, 1998

[54] COOLING OF TIRES AT THE END OF THEIR VULCANIZATION

[75] Inventor: Daniel R. Cleveland, Simpsonville, S.C.

[73] Assignee: Sedepro, Paris, France

[21] Appl. No.: 686,321

[22] Filed: Jul. 25, 1996

[30] Foreign Application Priority Data

Aug. 8, 1995 [FR] France ................................. 95/09705

[51] Int. Cl.[6] .............................. B29C 35/16; B29C 71/02
[52] U.S. Cl. ............................................ 264/348; 425/445
[58] Field of Search .................................. 264/315, 326, 264/346, 348, 237, 502; 425/445, 446, 58.1

[56] References Cited

U.S. PATENT DOCUMENTS

| | | | |
|---|---|---|---|
| 3,389,193 | 6/1968 | Hughes . | |
| 3,529,048 | 9/1970 | Kovac et al. . | |
| 3,632,701 | 1/1972 | DeVitt et al. | 264/346 |
| 3,635,610 | 1/1972 | Hall et al. | 425/446 |
| 3,772,756 | 11/1973 | Vokes et al. . | |
| 3,852,008 | 12/1974 | Shichman | 425/445 |
| 3,952,892 | 4/1976 | Robinson et al. . | |
| 4,585,405 | 4/1986 | Capecchi . | |
| 5,204,049 | 4/1993 | Siegenthaler . | |

FOREIGN PATENT DOCUMENTS

| | | |
|---|---|---|
| 1460639 | 2/1967 | France . |
| 845637 | 8/1960 | United Kingdom . |
| 2219285 | 12/1989 | United Kingdom . |

*Primary Examiner*—Mathieu D. Vargot
*Attorney, Agent, or Firm*—Baker & Botts, L.L.P.

[57] ABSTRACT

An apparatus for cooling tires at the end of their vulcanization which includes:

a frame having a base intended to be mounted on the ground, defining a horizontal orientation;

two shafts mounted for rotation on said frame, substantially parallel to each other and substantially parallel to the horizontal, at a distance from each other less than the outside diameter of the tires to be handled;

a drive for rotating at least one of the two shafts;

so that, when a tire is placed on said shafts with the axis of rotation of said tire arranged substantially parallel to the axes of said shafts, said drive for placing in rotation being activated, said tire is subjected to a gyroscopic force and remains in equilibrium.

14 Claims, 2 Drawing Sheets

COOLING OF TIRES AT THE END OF THEIR VULCANIZATION

BACKGROUND OF THE INVENTION

The present invention relates to the cooling of tires as they leave the vulcanization press. It also relates to the operations carried out on the tire after the vulcanization.

One of the problems encountered just after vulcanization consists of cooling the tire to a temperature which permits or facilitates the further handling. In general, upon emergence from the vulcanization, the vulcanization reaction is not entirely at an end. At this stage, the final level of the properties of mechanical strength of the tire have not yet been reached. It is, however, necessary that the vulcanization equipment be immobilized only for the minimum time necessary, so that its productivity is increased.

Therefore, at the time when the tire is removed from the mold, it should be handled with certain precautions. U.S. Pat. No. 5,204,049 illustrates a tire cooling device into which a tire is introduced just after it has been removed from the mold and while it is still substantially at the vulcanization temperature.

After vulcanization, the tire generally is subjected to verification tests, for instance on uniformity machines, and it must in any event be removed from the place where it has been vulcanized. Conveyors on which the tire travels horizontally are frequently used. Stated differently, the axis of rotation of the tire is parallel to the direction of the force of gravity. During this handling the problem arises of avoiding excessive mechanical stresses on the tire in order to avoid damaging it, particularly since it has not yet reached the maximum level of its properties of mechanical resistance.

SUMMARY OF THE INVENTION

The present invention proposes a device for cooling tires which minimizes static stresses, so as not to cause defects in uniformity due to handling. The handling subsequent to the vulcanization must be effected with sufficient care not to defeat the entire effort spent on the manufacturing equipment in order to produce tires which are as good as possible.

One specific purpose of the invention is to accelerate the speed of cooling of the tires upon emergence from vulcanization, so that they have, as soon as possible, mechanical properties sufficient to withstand the subsequent handling without damage.

Another object of the invention is to propose means which make it possible to introduce tires after cooling into a waiting line, at a stationary station, and to remove the tires one after the other from said waiting line to another stationary station.

In accordance with the invention, the vulcanized tire cooling device comprises:

- a frame having a base intended to be fastened securely to the ground, defining the horizontal orientation;
- two shafts mounted for rotation on said frame, substantially parallel to each other and substantially parallel to the horizontal, at a distance from each other less than the outside diameter of the tires to be handled;
- means for rotating at least one of the two shafts;

so that, when a tire is placed on said shafts with the axis of rotation of said tire arranged substantially parallel to the axis of said shafts, said means for placing in rotation being activated, said tire is subjected to a gyroscopic force and remains in equilibrium and is subjected to forced heat exchanges.

The invention will be fully understood from a reading of the following description, illustrated by means of the accompanying drawings and, in non-limitative fashion, by a specific embodiment which makes it possible to note all the advantages which can be expected from it.

DESCRIPTION OF PREFERRED EMBODIMENTS

Figure 1:
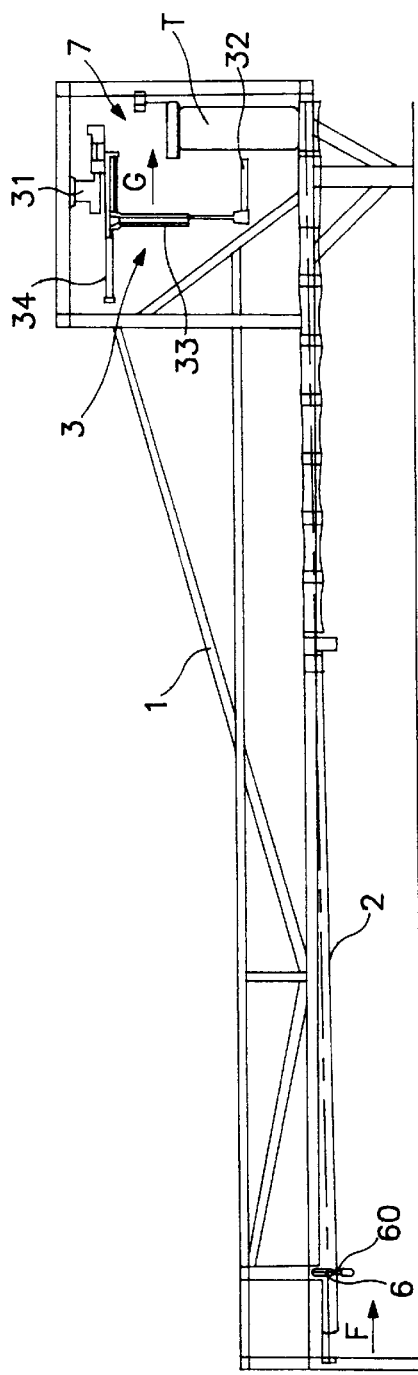
FIG. 1 is a view in elevation of the device of the invention.
Figure 2:
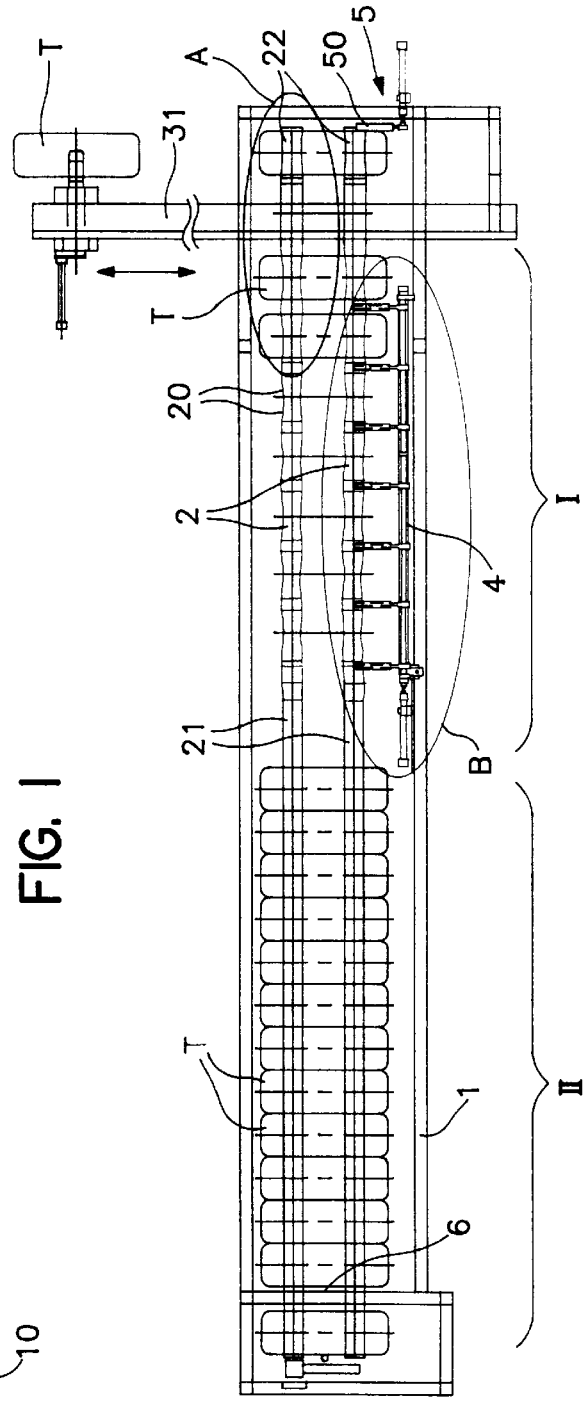
FIG. 2 is a plan view of said device.

FIG. 1 shows a frame 1 supporting two parallel and rotatable shafts for supporting the tires. One of the shafts can be driven or both can be driven in synchronism. Along a first part I of their length, it is seen that they have frustoconical bearing surfaces 20. These frustoconical bearing surfaces 20 are arranged in groups of two surfaces inclined towards each other, the groups of two being separated by a cylindrical bearing surface. These groups of frustoconical bearing surfaces 20 are arranged, on each of the shafts 2, facing each other. A group defines, on the shaft 2 in question, a V-shaped groove within which a tire can center itself. In a second portion II of the length of the shafts, the outer surfaces 21 of the shafts 2 are cylindrical and uniform.

Figure 4:
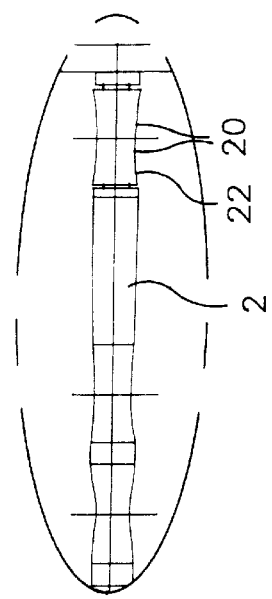
FIG. 4 is an enlarged view of the region A of FIG. 2.

On the right-hand side of the device there are installed two rollers 22, referred to herein as realignment rollers, mounted for free rotation with respect to the shafts 2. These realignment rollers 22 are arranged facing each other, adjacent to the groups of frustoconical bearing surfaces 20 on the side of said groups opposite the side where the cylindrical bearing surface 21 is located. Each of the realignment rollers 22 is coaxial with the corresponding adjacent shaft 2. FIG. 4 shows in detail the arrangement of each realignment roller 22 related to the respective shaft 2. Each of the shafts 2 has a surface of substantially reduced diameter on which a realignment roller 22 is concentrically mounted. These realignment rollers 22 also have frustoconical bearing surfaces 20 arranged in the same manner as explained above.

It is sufficient for only one of these realignment rollers 22 to be driven. The rotation thereof can thus be controlled independently of the rotation of the shafts 2. The realignment rollers are both equipped with a brake system, not shown. As a variant, it is also possible to drive both realignment rollers in synchronism.

Figure 5:
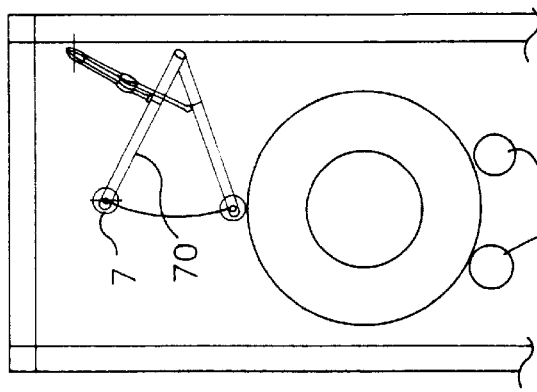
FIG. 5 is a view in the direction of the arrow G of FIG. 1.

A so-called bracket roller 7 (see FIG. 5) is mounted on an arm 70 pivoted on the frame 1. These parts are so arranged that the bracket roller 7 is disposed opposite and above the realignment rollers 22, whatever the position of the pivoted arm 70.

As can be noted from FIG. 1, the second portion II of the shafts 2 is inclined slightly with respect to the frame 1. The base 10 of the frame 1 is intended to be mounted directly on the ground or parallel to the horizontal. It results from this that the shafts 2 are arranged with a slight slope descending, when looking at FIG. 1, from the right to the left.

Figure 6:
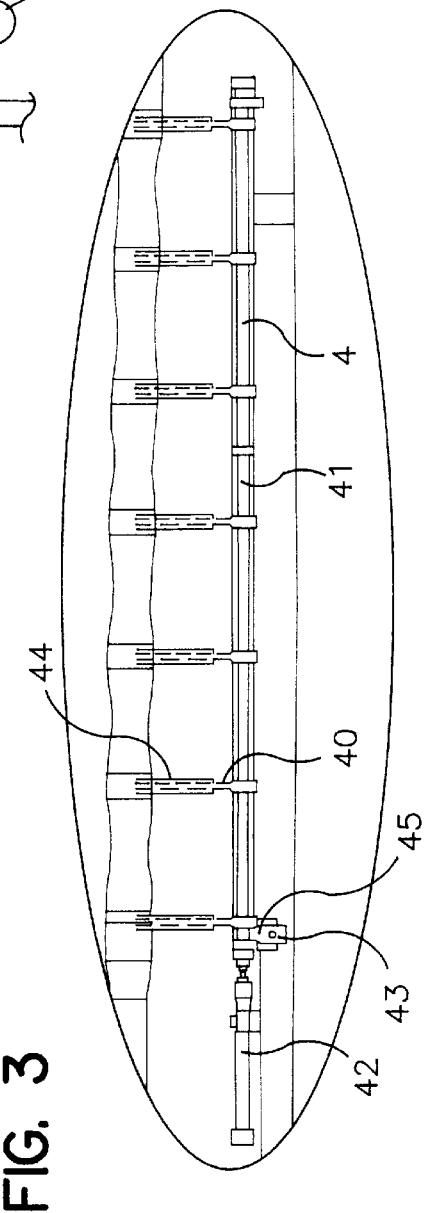
FIG. 6 is an enlarged view of the region B of FIG. 2.

Referring to FIG. 6, the portion of the device shown includes a member 4, referred to as a comb, formed of a group of rods 40. Each rod 40 is contained substantially within a plane perpendicular to the said shafts 2. Each rod can be displaced with respect to the frame 1, in parallel to said shafts 2. For this purpose, said rods are mounted on an axle 41 itself mounted on the frame 1. Each rod 40 bears a small roller 44 mounted for free rotation on it. The axle 41 can be displaced in its lengthwise direction by a cylinder-piston arrangement 42 and can be turned on itself by a piston-cylinder 43 actuating a crank pin 45. The comb 4 defines, with the grooves represented by the frustoconical bearing surfaces 20 on the shaft 2, six cells, each cell accommodating a single tire T. Up to six tires can thus be accommodated simultaneously, the tires remaining well spaced from each other so as to constitute a very effective tire-cooling device.

The rods 40 thus constitute a delimiting means, attached to the frame, defining by the shafts 2 at least one cell capable of containing preferably a single tire. The rods 40 are arranged on both sides of said cell and each may have a roller 44.

On this principle, various embodiments of cooling devices are possible. The device may comprise only a single cell. In that case, the rods will in general be fixed. Or else the device may have at least two cells, each capable of containing a single tire, and include means for the simultaneous displacement of the delimiting means, each shaft in this case having at least two groups of two adjacent frustoconical bearing surfaces, said surfaces being inclined towards each other, the groups of each of these shafts being disposed facing each other so as to define a groove receiving a tire, said groove being, in at least one position of said delimiting means, located substantially at the center of each cell.

In FIG. 1, there can also be noted a loading arm 3 arranged on the right-hand side of the device. This arm can be displaced horizontally along a rail 31, mounted substantially perpendicular to the general direction of the shafts 2, and above them. The arm 3 has a fork 32 which, by means of cylinder-piston arrangements (a vertical cylinder-piston arrangement 33/and horizontal cylinder-piston 34 visible in FIG. 1), can be inserted within a tire which is presented vertically facing the arm 3.

At the right-hand end of the device, there can also be seen a push arm 5 comprising a rotary roller 50 which is similar to the rollers on the rods 40.

Figure 3:
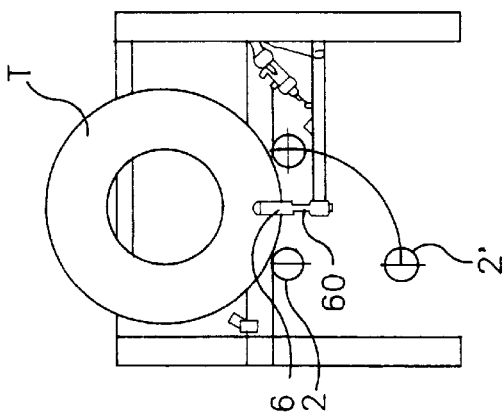
FIG. 3 is a view in the direction of the arrow F of FIG. 1.

On the left-hand end of the device, there is seen a blocking member formed by a roller 6 mounted on an axle 60 (see also FIG. 3). The axle 60 can be retracted or, on the other hand, raised so that the roller 6 protrudes over the level of the shafts 2. Beyond the roller 6, towards the left in FIG. 1, the device comprises an unloading cell. In this cell, a part 2' of the shaft is independent of the rest of the shaft and can be retracted, as shown in FIG. 3, in order to leave sufficient passage for the tire.

The operation of the device is as follows: The loading arm 3 grasps a tire by causing the fork 32 to engage on the inside of the beads of the tire T which has already been removed from the vulcanization press by means not shown in the drawing. The arm 3 has imparted to it all the movements necessary in order to shift the tire T and deposit it on the realignment rollers 22. Initially, the realignment rollers 22 are stationary. The tire T is deposited on them by the arm 3. The bracket roller 4 descends and rests on the tread of the tire. The tire is therefore firmly held between three points— each of the two realignment rollers and the upper bracket roller. The loading arm 3 is retracted.

The tire is then placed in rotation; this rotation causes an automatic realignment of the tire due to the action of the frustoconical bearing surfaces 20 present on the realignment rollers 22 and on the bracket roller 7. Realignment means that the axis of rotation of the tire is placed and stabilized in a direction parallel to the axis of rotation of the shafts 2.

At this station, it is possible to proceed with an inspection of the tire, for instance a visual inspection, or it is possible to project some product onto it either on the inner surface or on the outer surface thereof.

The speed of rotation of the tire is increased gradually by controlling the speed of rotation of at least one of the realignment rollers 22 which is driven by a motor. When the speeds of the realignment rollers 22 and the shaft 2 are substantially equivalent, the tire can be transferred laterally onto the shafts 2. This mechanism operates in the manner of a clutch in order to bring the tire gradually to a speed of rotation compatible with that of the shafts 2.

It has been found by experiment that the realignment takes place in only a few turns of the tire. The speed of rotation of the tire is increased up to a level sufficient to produce a small gyroscopic force, which assists in stabilizing the tire in vertical position. The bracket roller 7 is retracted and the tire remains stable in rotation on the realignment rollers 22. Preferably, said rotary shaft is driven at least at a stabilized final speed (after the acceleration phase) such that the tire or tires turn on their own axis or axes of rotation at a speed of at least 30 rpm.

The invention therefore proposes a cooling process which comprises the following steps:

the use of two rotary cylindrical shafts substantially parallel to each other, disposed at a distance from each other less than the outside diameter of the tires to be handled, the axes of said shafts being arranged substantially perpendicular to the direction of gravity;

placing at least one of the two cylindrical tires in rotation and placing at least one tire on said shafts, disposing the axis of rotation of said tire substantially parallel to the axis of said shafts;

so that the rotation of the shaft causes the placing in rotation of the tire and the appearance of a gyroscopic effect sufficient to maintain the tire in equilibrium, as well as a heat exchange by forced convection.

In order to favor the cooling, each tire is transferred individually towards the cooling cells of the first portion I. The push arm 5 comes into contact with the sidewall of the tire and pushes the tire towards the first of the cooling cells. Due to the gyroscopic effect, the tire remains upright, in rotation on the shafts 2.

During the cooling phase, the tires remain held well-spaced from each other by the rods 41. This permits a good heat exchange by forced convection over the entire outer surface of the tire. The cooling is itself faster the greater the relative speed between the tire and the surrounding air.

Subsequently, each tire introduced from the right-hand side of the handling device can be displaced laterally from cell to cell by pressing laterally on its sidewall. Due to the gyroscopic effect, the tire has no tendency to fall down on the shafts 2.

The said comb not only represents the cells but in particular it assures the translation of the tires by the fact that all the rods can be displaced together, using a combination of the following movements:

a first movement parallel to said shafts, a movement towards or away from said shafts.

The operation of the comb is as follows. The pivotal rotation of the axle 41 causes a lifting of the rods 40

(movement away from said shafts). The longitudinal displacement of the axle 41 permits all the rods 40 to shift by one place with respect to the tire in rotation on the shafts 2. Thereupon, a new reverse pivotal rotation of the axle 41 permits the rods 40 to move down again between the tires (see FIG. 5). Finally, a return longitudinal displacement of the axle 41 to its initial position causes a push by each of the rods 40 against the sidewall of the tire which is contained in the cooling cell. The tires are pushed gradually towards the adjacent cell. The displacement of the rods 40 forces the tires to rise out of the recessed well formed by the frustoconical bearing surfaces on the shafts 2. The tire is thus pushed towards the next cell. The tire which was already in the last of the cooling cells is pushed onto the second portion of the shafts 2.

As described above, this second portion is slightly declined with respect to the horizontal direction. For example, the axis of the shafts 2 forms an angle of between 0.2° and 2° with respect to the horizontal. Therefore, the force of gravity tends to move each of the tires gently towards the left, that is to say towards the discharge end of the path defined by the two shafts 2.

The tires which are already substantially cooled can accumulate in a number such as to fill the space available on the rotating shafts 2. Each of the tires travels spontaneously towards the outlet of the handling device. The leading tire is maintained in proper position for discharge by the end blocking roller 6. As required, this blocking roller 6 is retracted by a manual or an automatic control to permit the lead tire to pass to the discharge cell. The portion 2' of the shaft is then retracted upon demand in order to permit passage of the tire.

Summarizing, the invention proposes maintaining tires in rotation in vertical position in order to favor their cooling and then to regroup them at a waiting station. In order to permit this, the invention proposes creating a gyroscopic force sufficient so that the tire remains by itself in vertical position even if it experiences lateral pushes on its sidewall. This property can be utilized in order to leave the tires for a certain time in waiting position during a cooling operation just after curing, and so that the tires move naturally on a guide path formed by two rotating shafts between an entrance position and an exit position.

The advantage in carrying out a cooling operation of this type is that the rotation of the tire imparts a cooling which is not only very effective but also very uniform, contrary to what would take place if the tire were simply placed on a table. If the tire is arranged on a table vertically without being placed in rotation, there is the danger of circumferential non-homogeneity. If the tire is disposed on a table horizontally, there is the danger of lack of symmetry between one side and the other of the tire.

Finally, when the tires travel naturally along the shafts 2 as has been explained, they do not suffer any shock on their tread, this shock developing forces oriented substantially radially, and therefore there is the danger of the tire retaining the trace thereof. The invention thus makes it possible to produce buffer storage zones between different operations to be carried out on the tire after curing. They lend themselves to producing a machine of extremely compact dimensions.

I claim:

1. An apparatus for the cooling of vulcanized tires comprising:
 a frame comprising a base intended to be firmly mounted on the ground, defining the horizontal direction;
 two shafts mounted for rotation on said frame, substantially parallel to each other and substantially parallel to the horizontal, at a distance from each other less than the outside diameter of the tires to be cooled;
 means for placing at least one of the two shafts in rotation; wherein each shaft includes at least one group of two adjacent frustoconical bearing surfaces inclined towards each other, the groups of each of the shafts being disposed facing each other so as to define a groove receiving a tire, so that, when a tire is disposed on said shafts with the axis of rotation of said tire arranged substantially parallel to the axis of said shafts, said means for placing in rotation being activated, said tire is subjected to a gyroscopic force and remains in equilibrium and is subjected to forced heat exchanges to cool the tire.

2. An apparatus according to claim 1, wherein the axes of at least a portion of said shafts are disposed slightly declined with respect to the horizontal.

3. An apparatus according to claim 2, wherein said axes form an angle of between 0.2° and 2° with the horizontal.

4. An apparatus according to claim 1, including delimiting means connected to the frame so as to define along said shafts at least one cell capable of containing a single tire.

5. An apparatus according to claim 4, wherein said delimiting means includes at least one rod on both sides of said cell, said rod being substantially contained within a plane perpendicular to said shafts, each rod being capable of being displaced with respect to the frame in parallel with respect to said shafts.

6. An apparatus according to claim 1, including delimiting means connected to the frame so as to define by said shafts at least two cells each capable of containing a single tire and means for simultaneous displacement of the delimiting means, and in which each shaft has at least two groups of two adjacent frustoconical bearing surfaces, said surfaces being inclined towards each other, the groups of each of the shafts being disposed facing each other so as to define a groove receiving a tire, said groove being, for at least one position of said delimiting means, located substantially at the center of each cell.

7. An apparatus according to claim 6, wherein said delimiting means include at least one rod on each side of each cell, said rod being substantially contained in a plane perpendicular to said shafts, each rod being displaced with respect to the frame parallel to said shafts by said displacement means.

8. An apparatus according to claim 7, wherein all the rods are displaced together utilizing, in combination, the following movements:
 a movement parallel to said shafts;
 a pivotal movement away or towards said shafts.

9. A process for the cooling of a tire after the vulcanization thereof, comprising the following steps:
 using two rotary shafts substantially parallel to each other and arranged at a distance from each other less than the outside diameter of the tires to be handled, the axis of said shafts being disposed substantially perpendicular to the direction of gravity, each shaft including at least one group of two adjacent frustoconical bearing surfaces inclined towards each other, the two groups of each of the shafts being disposed facing each other so as to define a groove receiving a tire;
 placing at least one of the two shafts in rotation;
 depositing at least one tire at a temperature close to the vulcanization temperature on said shafts, disposing the axis of rotation of said tire substantially parallel to the axis of said shafts;
so that the rotation of the shaft causes the placing in rotation of the tire to produce a gyroscopic effect sufficient to maintain the tire in equilibrium and a heat exchange by forced convection to cool the tire.

10. A process according to claim 9, including driving said rotary shaft at a speed at least such that the tire or tires turn around their own axis of rotation at a speed of at least 30 rpm.

11. An apparatus for the cooling of vulcanized tires comprising a pair of longitudinally extending rotatable, parallel shafts for supporting a cured tire during cooling, said shafts having a loading end and a discharge end, means for driving at least one of the two shafts at a speed necessary to subject the tire to a gyroscopic force so that the tire remains in equilibrium on the shafts, and means for displacing a rotating tire in equilibrium longitudinally along said rotating shafts from the loading end toward the discharge end for cooling the tire.

12. An apparatus as set forth in claim 11 in which said displacing means includes means for separating a plurality of rotating tires on said rotating shafts during cooling.

13. A method for the cooling of vulcanized tires comprising supporting a cured tire for cooling on a pair of longitudinally extending rotatable, parallel shafts, loading a cured tire to be cooled at a loading end of said shafts, driving at least one of the two shafts at a speed necessary to subject the tire to a gyroscopic force so that the tire remains in equilibrium, and displacing a rotating tire in equilibrium longitudinally along said rotating shafts toward a discharge end for cooling the tire.

14. A method as set forth in claim 13 including separating a plurality of rotating tires on said two shafts during cooling.

* * * * *